(12) United States Patent
White

(10) Patent No.: US 10,645,178 B2
(45) Date of Patent: May 5, 2020

(54) OMNI-CHANNEL VIRTUAL REALITY (VR) COLLABORATION

(71) Applicant: NCR Corporation, Duluth, GA (US)

(72) Inventor: Joseph Arnold White, Encinitas, CA (US)

(73) Assignee: NCR Corporation, Atlanta, GA (US)

(*) Notice: Subject to any disclaimer, the term of this patent is extended or adjusted under 35 U.S.C. 154(b) by 643 days.

(21) Appl. No.: 15/363,590

(22) Filed: Nov. 29, 2016

(65) Prior Publication Data

US 2018/0152522 A1    May 31, 2018

(51) Int. Cl.
| | | |
|---|---|---|
| *H04L 29/08* | (2006.01) | |
| *G06F 3/01* | (2006.01) | |
| *G06F 3/0484* | (2013.01) | |
| *G06F 3/0488* | (2013.01) | |
| *G06Q 20/36* | (2012.01) | |
| *G06Q 20/20* | (2012.01) | |
| *G06F 9/451* | (2018.01) | |
| *H04L 29/06* | (2006.01) | |
| *G06Q 30/06* | (2012.01) | |
| *G06Q 20/12* | (2012.01) | |
| *G06Q 20/42* | (2012.01) | |

(52) U.S. Cl.
CPC ............ *H04L 67/148* (2013.01); *G06F 9/451* (2018.02); *G06Q 20/12* (2013.01); *G06Q 20/202* (2013.01); *G06Q 20/36* (2013.01); *G06Q 20/425* (2013.01); *G06Q 30/0643* (2013.01); *H04L 67/20* (2013.01); *H04L 67/38* (2013.01); *H04L 67/02* (2013.01)

(58) Field of Classification Search
CPC ....... H04L 67/148; H04L 67/38; H04L 67/20; H04L 67/02; G06F 9/451; G06Q 20/202; G06Q 20/36
USPC ......................................................... 709/227
See application file for complete search history.

(56) References Cited

U.S. PATENT DOCUMENTS

| | | | | |
|---|---|---|---|---|
| 6,782,412 | B2 * | 8/2004 | Brophy | ............. H04L 29/06027 379/202.01 |
| 9,901,818 | B1 * | 2/2018 | Wakeford | ................. A63F 9/24 |
| 9,919,218 | B1 * | 3/2018 | Wakeford | ................. G06F 3/01 |
| 2001/0019337 | A1 * | 9/2001 | Kim | .................... G06F 3/04815 715/757 |
| 2007/0133507 | A1 * | 6/2007 | Da Palma | ............... H04L 67/32 370/352 |
| 2007/0136421 | A1 * | 6/2007 | Da Palma | ............... A63F 13/77 |
| 2008/0097845 | A1 * | 4/2008 | Altberg | .................. G06Q 30/02 705/14.61 |
| 2008/0141147 | A1 * | 6/2008 | Buhrke | .................... G06F 3/048 715/757 |

(Continued)

*Primary Examiner* — David R Lazaro
*Assistant Examiner* — Berhanu Shitayewoldetadik
(74) *Attorney, Agent, or Firm* — Schwegman, Lundberg & Woessner

(57) ABSTRACT

A consumer engages in a session over a first communication channel that is not a Virtual Reality (VR) communication channel. The consumer dynamically switches from the first communication channel to a VR communication channel while maintaining the context of a first session over the first communication channel in a new VR session over the VR communication channel. While engaged in the VR session, the consumer collaborates with one or more retailers that participate in the VR session with the consumer.

20 Claims, 5 Drawing Sheets

(56) References Cited

U.S. PATENT DOCUMENTS

| | | | | |
|---|---|---|---|---|
| 2008/0263460 | A1* | 10/2008 | Altberg | G06Q 30/02 715/757 |
| 2010/0216425 | A1* | 8/2010 | Smith | G06Q 20/32 455/406 |
| 2011/0307807 | A1* | 12/2011 | Norby | G06Q 10/101 715/758 |
| 2012/0078700 | A1* | 3/2012 | Pugliese, III | G06Q 30/02 705/14.25 |
| 2012/0185886 | A1* | 7/2012 | Charaina | H04N 7/16 725/2 |
| 2013/0190016 | A1* | 7/2013 | Krishnakumar | A63F 13/216 455/456.3 |
| 2014/0052550 | A1* | 2/2014 | Glazer | G06Q 30/0253 705/14.73 |
| 2014/0282619 | A1* | 9/2014 | Michie | H04L 67/02 719/318 |
| 2014/0320529 | A1* | 10/2014 | Roberts | G06T 19/006 345/633 |
| 2015/0215351 | A1* | 7/2015 | Barzuza | G06T 19/006 715/757 |
| 2015/0373148 | A1* | 12/2015 | He | A63F 13/77 |
| 2016/0124499 | A1* | 5/2016 | Shiu | G06F 3/011 715/778 |
| 2016/0314624 | A1* | 10/2016 | Li | G06F 1/163 |
| 2017/0249785 | A1* | 8/2017 | Hooper | G06F 3/016 |
| 2017/0364920 | A1* | 12/2017 | Anand | G06Q 20/40 |

* cited by examiner

OMNI-CHANNEL VIRTUAL REALITY (VR) COLLABORATION

BACKGROUND

Virtual Reality (VR) and Augmented Reality are rapidly being integrated into mainstream consumer use and adoption. For the most part the adoption has been limited to standalone applications that consumer's access to experience a three-dimensional experience of a real world place or an animated place. Adoption has been made within the gaming community as well for purposes of playing video games.

Current estimates project over 200 million VR headsets will be sold by the year 2020 in the United States only, which represents $\frac{2}{3}^{rds}$ of the current United States population.

Presently, there is very little technology providing collaboration within existing VR applications with the gaming industry being the exception.

Retailers have made a lot of progress in terms of reaching consumers through the various technology modes that consumers have adopted. However, very little progress has been made by retailers with respect to VR. Moreover, the progress that retailers have made is often communication channel specific, such that when a consumer contacts a retailer via specific electronic communication mechanism, there has been very little progress in permitting that same consumer during the specific electronic communication mechanism to switch to a different electronic communication mechanism. This means that some consumers that switch been various types of electronic communication mechanisms may be lost or may not be reached in a manner that reflects the preferences and behavior of the consumers.

SUMMARY

In various embodiments, methods and a system for omni-channel VR collaboration are presented.

According to an embodiment, a method for omni-channel VR collaboration processing is provided. Specifically, and in one embodiment, an indication is received to migrate a session over a communication channel to a Virtual Reality (VR) session over a VR communication channel and configuring the VR session with a current context of the session for the communication channel.

DETAILED DESCRIPTION

Figure 1A:
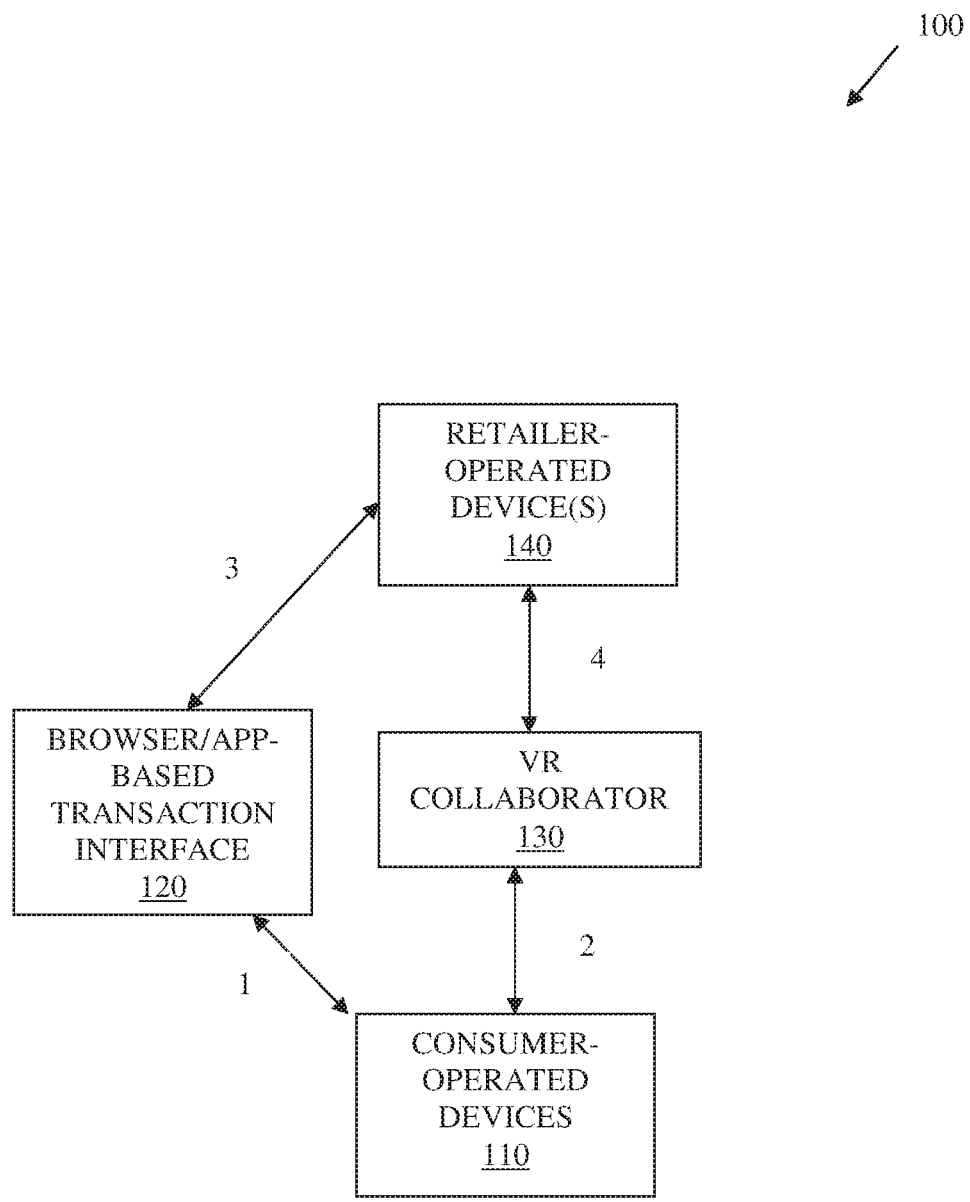
FIG. 1A is a diagram of a system for dual-channel VR collaboration, according to an example embodiment.

FIG. 1A is a diagram of a system 100 for dual-channel VR collaboration, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the omni-channel VR collaboration processing embodiments presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for omni-channel VR collaboration processing can be implemented in all, or some combination of the components shown in different hardware computing devices having one or more hardware processors.

The system 100 includes: consumer-operated devices 110, a browser/application (app)-based transaction interface 120, a VR collaborator 130, order management 180 (shown in the FIG. 1B), and retailer-operated device(s) 140.

The system 100 permits integration and collaboration between a consumer and one or more retailers utilizing at least two or more different communication channels (web/app based communications and VR communications). The system 100 permits a consumer to switch back and forth between the two or more different communication channels while maintaining an interaction state during the switching between the different communication channels for an ongoing session between the consumer and the one or more retailers.

Conventional ecommerce transactions provide no real-world context to the consumer that is shopping through an ecommerce site and leaves the consumer with no comfort about whether the item being purchased by the consumer will work for them. This is particularly true of goods of larger size, such as furniture, televisions, refrigerators, etc. As a result, the consumer will often visit a physical store to see the item in person, but the physical store is often higher priced than what is available through ecommerce sites. If the consumer is not completely frustrated at this point and is willing to wait even longer now for the item, the consumer will return to the ecommerce site and purchase the item in the size and type that the consumer liked while in the physical store. Furthermore, for some rural consumers or for some items that are not popular, the consumers may not even be able to easily visit a physical store that has the desired item without experience a significant travel time (assuming the travel time is feasible, which it may not be).

These problems and others are alleviated by the teachings presented herein. Specifically, the system 100 permits the consumer to experience a real-world encounter with a desired item through VR and seamlessly links the consumer's ecommerce experience with the VR experience in one communication session. Items selected at an ecommerce site can be selected for the consumer to immediately and seamless experience in a VR communication session. The VR showroom is modeled after the retailer's actual physical showrooms. The context (state) that the consumer had when transitioning from the ecommerce session to the VR showroom session is maintained within the VR showroom (such as shopping cart, model, manufacturer, price, etc.) and non-obtrusively depicted within the VA showroom (such as displayed on a wall within the VA showroom). The consumer can also switch on demand back to the ecommerce session and maintained the state (context) that was present when the VR session was exited. The items appear in an actual real-world size and context within the VR session from the perspective of the consumer. Moreover, one or more sales associates can enter and leave the VR session and collaborate with the consumer. Any purchase or order made during the dual sessions (ecommerce and VA) that appear as one integrated session to the consumer can be made in the environment preferred by the consumer (ecommerce or VR).

These and other beneficial aspects of the embodiments are now discussed with reference to the system 100 and the FIG. 1A.

Initially, at 1, a consumer operates one of the consumer-operated devices 110 and browses an ecommerce site during through an ecommerce communication channel associated with an initial ecommerce communication session between the consumer and the ecommerce site. The ecommerce session displays in the browser/app-based transaction interface 120 (such as a rendered web page) an option that the consumer can select to switch to a VR session through a VR communication session.

In an embodiment, the option to switch to the VR session can be part of the ecommerce rendered web page.

In an embodiment, the option to switch to the VR session can be rendered and superimposed on the ecommerce web page without altering or changing the ecommerce web page. This could be done through a proxy server that monitors the ecommerce site for the state of the ecommerce session and that generates a Quick Response (QR) code for uniquely recalling the ecommerce session when the ecommerce page is rendered. The proxy server may be a reverse proxy to the ecommerce site, such that the actual ecommerce transaction interface does not require modification for integration of the option to switch to the VR session. In this embodiment, an Application Programming Interface (API) can be used by the proxy server to also interact with the ecommerce site, such that backward context when moving from the VR session back to the ecommerce session can be synchronized and maintained.

Once the option is activated within the browser/app-based transaction interface 120 by the consumer through the consumer-operated device 110, the VR collaborator 130 is notified of the session transition. The context that the consumer had in the ecommerce session is communicated to the VR collaborator 130. The context can include, by way of example only, a consumer name (but not necessary), a consumer payment method(s) registered with the ecommerce site (again not necessary), an item that was selected for viewing by the consumer in the VR session, a quoted price for that item from the ecommerce site, a particular manufacturer of the item, a particular model of the item, contents of other items and their prices that may exists in the consumer's shopping cart with the ecommerce session when the transition was made to the VR session, any color selection or size selection for the item that existed during the ecommerce session, any preferences previously recorded or noted for the consumer with respect to the ecommerce session and/or the VR session (such as loyalty account details (level, points, etc.), spoken and written language preferred by the consumer, preferred payment method, preferred retailer showroom for viewing, preferred setting for showroom (outdoor versus indoor), and the like).

The VR collaborator 130 then configures itself with the appropriate VR constructs to generate the interactive VR session including any desired retailer showroom, setting, the item, and the context (shopping cart from ecommerce session) and generates the VR session environment.

The consumer then operates a same or different consumer-operated device 110, such as VR goggles and experiences the ongoing context of an integrated interactive session (ecommerce session state preserved in the VR session). A wall in the VR session can be used for displaying the ongoing ecommerce session context. The physical context and size of the item being reviewed is depicted within the VR session for consumer review and experience. In an embodiment, the consumer can even see representations of the consumer's hands when the hands are moved in front of the goggles or to grab an object within the VR showroom.

The consumer can request (through voice or an option depicted on a wall within the VR session) that a retailer or someone with experience with the item being reviewed be present within the VR showroom. In an embodiment, the retailer can participate or request to participate in the VR session without a specific request of the consumer (unsolicited). The retailer or expert on the item, is then permitted to collaborate with the consumer through a retailer-operated VR-enabled device 140.

The context of the ecommerce session can be communicated via 3 with the retailer entering the collaboration VR session with the consumer at 4. Voice communications and visual communications can ensure within the VR session between the retailer and the consumer. A variety of actions can be performed, such as but not limited to, the consumer requesting a different item or different size/color/make/model of the item or that the item be moved within the VR showroom to a different setting or different location within the VR showroom. The retailer can perform cause the appropriate operations to be processed with the VR collaborator 130 such that the commands or requests of the consumer are fulfilled within the VR session. In an embodiment, the retailer appears to the consumer as an avatar that moves around the room and changes aspects of the room or the item or other items to demonstrate something to the consumer or upon requests of the consumer. Full collaboration between the retailer and the consumer can occur within the VR session.

The consumer can even checkout and purchase the item, a different item, and/or items in an existing shopping cart during the VR session and perhaps even with simulated assistance from the retailer. For example, the consumer may place a credit card in the consumer's hand and extend the card forward so it appears to be handed to the avatar retailer within the VR session. The retailer can take the card and perform the transaction. Any registered or known payment method can also be used by the consumer utilizing a digital wallet within the VR session with the retailer.

The consumer may elect to conclude the transaction with payment though the ecommerce site, may elect to leave the VR session, or may decline any purchase at all. Either a verbal command or a selection on a wall within the VR session permits the consumer to transition back to the ecommerce session. Items may have been added or removed from the consumer's shopping cart during the VR session. The VR collaborator 130 and/or retailer provide the existing state or context of the ongoing integrated session to the browser/app-based transaction (ecommerce) interface 120, which configures itself for the appropriate synchronized context or state. The consumer then operates the same or different device 110 and continues with the ecommerce session with the VR session temporarily suspended. The consumer can continue as many times as desired to transition back and forth between the ecommerce session and the VR session.

In an embodiment, multiple different retailers can enter the VR session to collaborate with the consumer. In some cases, the retailers can compete with one another in terms of price for the item or other aspects of the item. In some cases, the retailers can complement one another where multiple different items are being reviewed by the consumer within the VR session (the added items may have been added during the VR session or related to items that existed in the shopping cart of the consumer when the consumer transitioned from the ecommerce session to the VR session).

Although the FIG. 1A was shown from the perspective of two communication channels (ecommerce and VR), the embodiments presented herein can include more than two integrated channels (omni-channel VR integration). Some additional channel integration is now discussed with reference to the FIG. 1B.

Figure 1B:
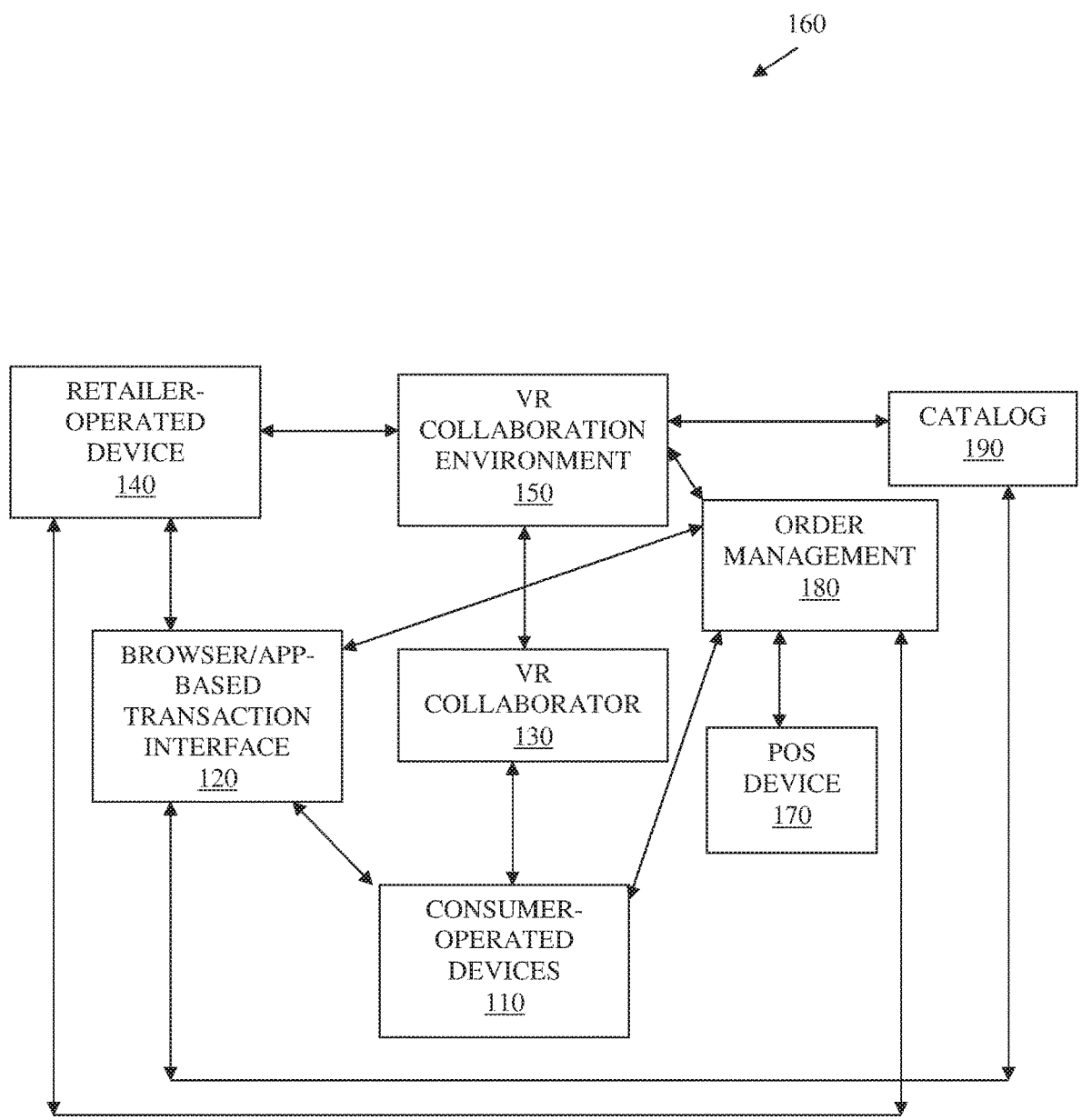
FIG. 1B is a diagram of another system for multi-channel VR collaboration, according to an example embodiment.

FIG. 1B is a diagram of another system 160 for multi-channel VR collaboration, according to an example embodiment.

The system 160 adds other channels that the consumer may be utilizing such as a Point-Of-Sale (POS) device 170 (for instance a Self-Service Terminal (SST)). The FIG. 1B also shows the VR session being instantiated within a VR collaboration environment 150, the VR collaboration environment 150 having access to other input sources such as order processing 180 and item catalogs 190.

It is noted the interface 120 is associated with an ecommerce site or communication channel.

In the FIG. 1B, the consumer can switch back and forth between a POS channel, an ecommerce channel, and a VR channel in the manners described above with respect to the FIG. 1B. Here, the consumer maybe using a consumer phone 110 for accessing the interface 120 over a phone-based web browser while standing at a SST 170. The interaction of the consumer is logically represented as a single integrated and synchronized session but can include a POS session, an ecommerce session, and a VR session. The consumer may also have VR goggles 110 to enter and experience the VR session. The consumer can switch at will between the different sessions while maintaining context for the single integrated session. One or more retailers can enter the VA collaboration environment 150 and collaborate with the consumer during the VR session.

In an embodiment, the POS device 170 is an ATM. In an embodiment, the POS device 170 is a cashier-operated terminal and the VR session is initiated by the cashier on behalf of the consumer, such as to allow the consumer to experience an item and have an expert interact with the item and the consumer in the VR collaboration environment 150 during the VA session. In an embodiment, the POS device 170 is a kiosk.

It is noted that other channels can be synchronized with the VA collaboration environment 150 besides browser-based channels and POS channels. For example, a voice session carried out through Amazon® Echo® or Apple® Siri® can be synchronized with the VR collaboration environment 150.

Moreover, the consumer VR device 110 is synchronized and available for immediate use without any pre-configuration with the channel that is non-VR (web, POS, voice, wearable processing device (watch)); synchronization is achieved through the non-VR session and pushed to the VR device 110, such that when the VR device 110 is put on the consumer (VA goggles), the consumer is in the VR collaboration environment with the synchronized state.

The embodiments discussed in the FIGS. 1A-1B and other embodiments are now discussed with reference to the FIGS. 2-4.

Figure 2:
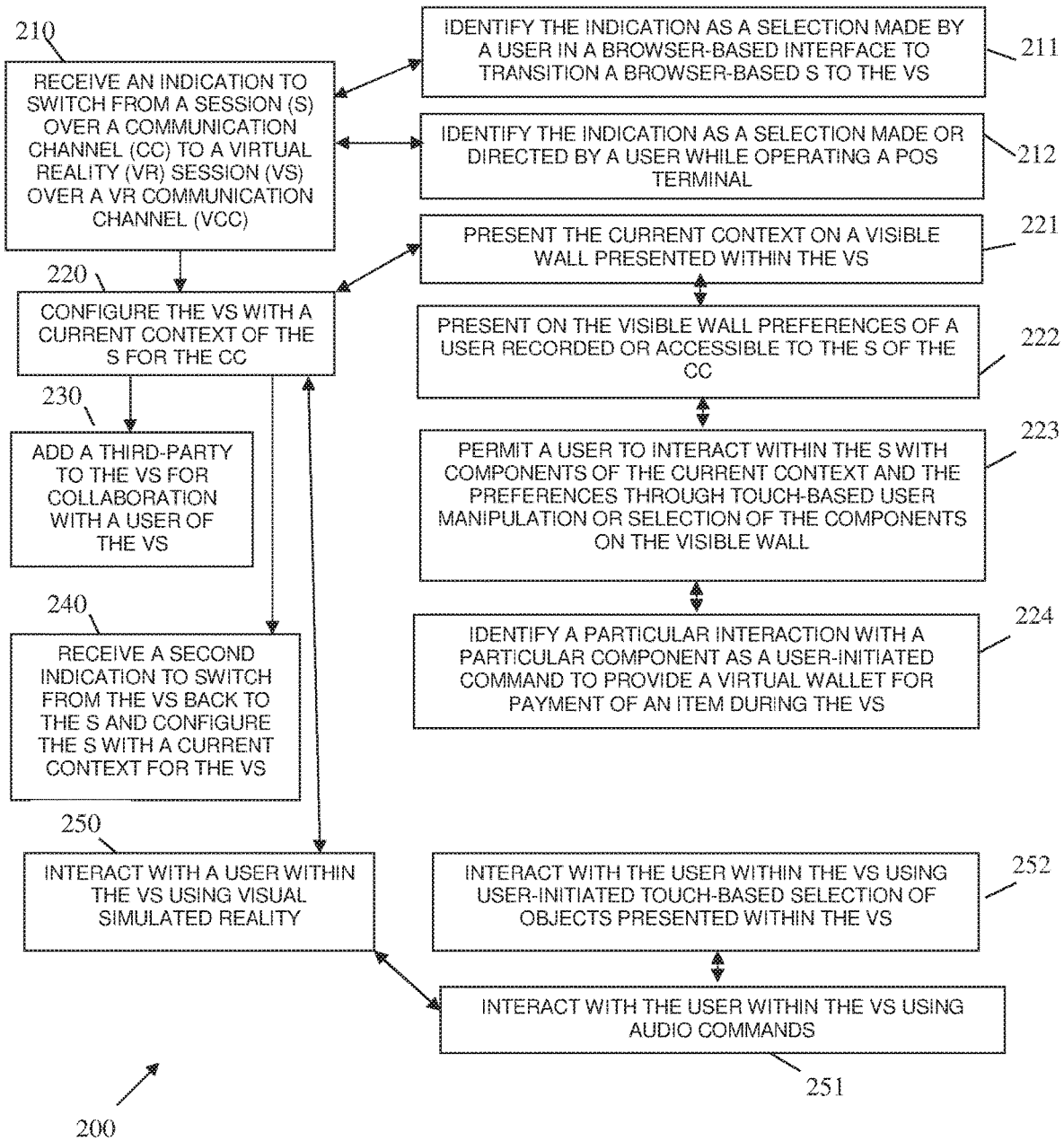
FIG. 2 is a diagram of a method for omni-channel VR collaboration processing, according to an example embodiment.

FIG. 2 is a diagram of a method 200 for automated image metadata processing, according to an example embodiment. The software module(s) that implements the method 200 is referred to as an "omni-channel VR manager." The omni-channel VR manager is implemented as executable instructions programmed and residing within memory and/or a non-transitory computer-readable (processor-readable) storage medium and executed by one or more hardware processors of a hardware computing device. The processors of the device that executes the omni-channel VR manager are specifically configured and programmed to process the omni-channel VR manager. The omni-channel VR manager has access to one or more networks during its processing. The networks can be wired, wireless, or a combination of wired and wireless.

In an embodiment, the device that executes the omni-channel VR manager is a server. In an embodiment, the server is a cloud processing environment.

In an embodiment, the omni-channel VR manager is the VR collaborator 130.

At 210, the omni-channel VR manager receives an indication to switch from a session over a communication channel to a VR session occurring over a VR communication channel. This can occur in any of the manners discussed above with the FIGS. 1A-1B where the user has an initial session through an ecommerce interface 120 or a POS device 170.

According to an embodiment, at 211, the omni-channel VR manager identifies the indication as a selection made by a user in a browser-based interface to transition a browser-based session to the VR session. In an embodiment the browser-based interface is the interface 120.

In an embodiment, at 212, the omni-channel VR manager identifies the indication as a selection made or directed by a user while operating a POS terminal. In an embodiment, the POS terminal is the POS device 170. In an embodiment, the POS terminal is a SST and the selection is made by the user. In an embodiment, the POS terminal is a POS terminal operated by a cashier and the selection is made by the cashier on behalf of the user.

At 220, the omni-channel VR manager configures the VR session with a current context of the session for the communication channel. That is, the context and state of the session that is being transitioned is configured in the VR session.

According to an embodiment, at 221, the omni-channel VR manager presents the current context on a visible wall presented within the VR session.

In an embodiment of 221 and at 222, the omni-channel VR manager presents on the visible wall preferences of a user recorded within or accessible to the session of the communication channel that is being transitioned from. This was discussed above with reference to the FIG. 1A.

In an embodiment of 222 and at 223, the omni-channel VR manager permits a user to interact within the VR session with components of the current context and the preferences through touch-based user manipulation or selection of the components on the visible wall.

In an embodiment of 223 and at 224, the omni-channel VR manager identifies a particular interaction with a particular component as a user-initiated command to provide a virtual wallet for payment of an item during the virtual session.

According to an embodiment, at 230, the omni-channel VR manager adds a third-party to the VR session for collaboration with a user of the VR session. This may be a retailer selling an item within the VR session or an expert on the item.

In an embodiment, at 240, the omni-channel VR manager receives a second indication to switch from the VR session back to the session and the omni-channel VR manager configures the session with a current context/state for the VR session that existed when the second indication was received.

In an embodiment, at 250, the omni-channel VR manager interacts with a user within the VR session using visual simulated reality.

In an embodiment of 250 and at 251, the omni-channel VR manager interacts with the user within the VR session using audio commands or voice-driven commands or dictation.

In an embodiment of 251 and at 252, the omni-channel VR manager interacts with the user within the VR session using user-initiated touch-based selection of objects presented within the VR session.

Figure 3:
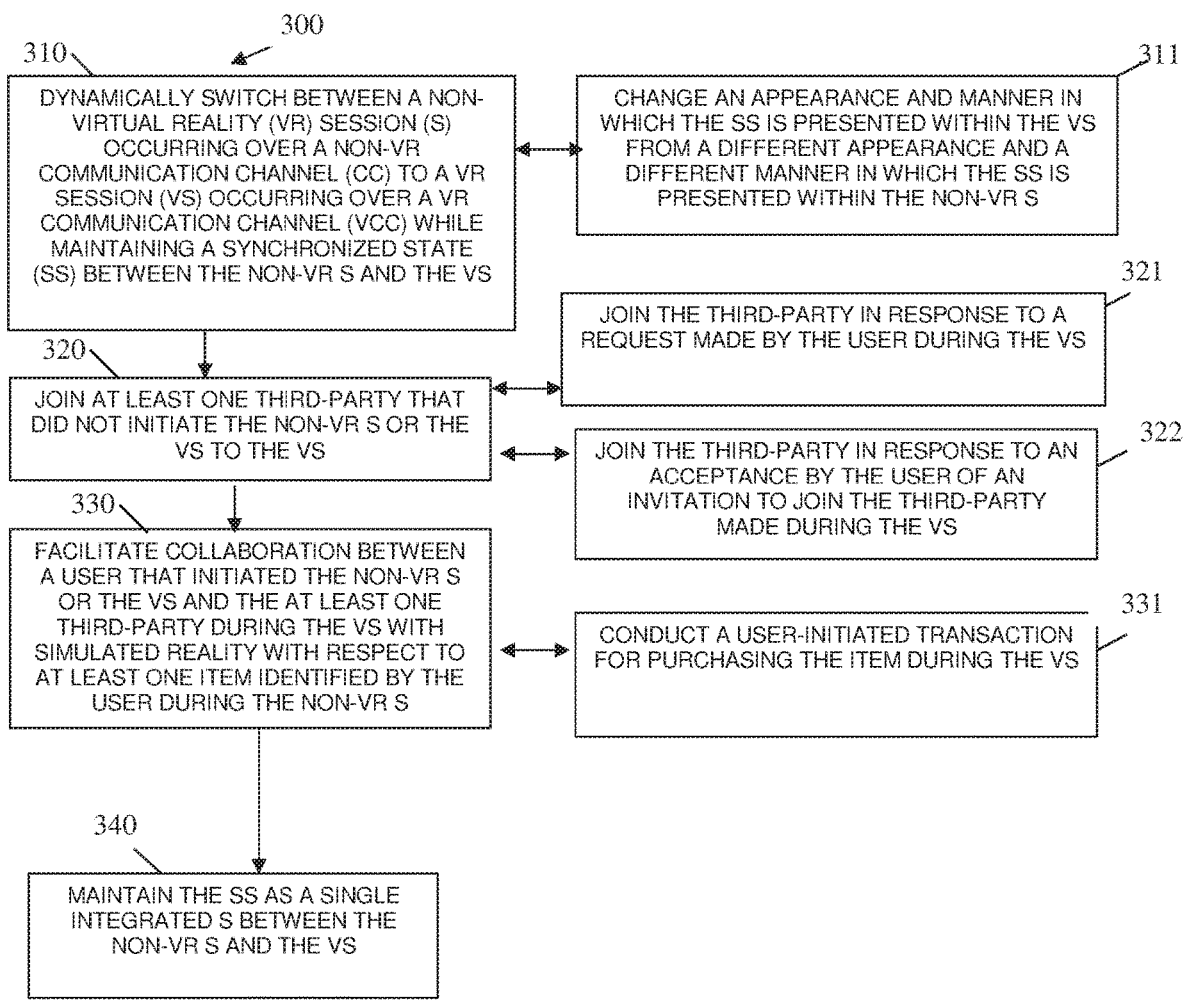
FIG. 3 is a diagram of another method for omni-channel VR collaboration processing, according to an example embodiment.

FIG. 3 is a diagram of another method for automated image metadata processing, according to an example embodiment. The software module(s) that implements the method 300 is referred to as a "VR session integrator." The VR session integrator is implemented as executable instructions programmed and residing within memory and/or a non-transitory computer-readable (processor-readable) storage medium and executed by one or more hardware processors of a hardware device. The processors of the device that executes the VA session integrator are specifically configured and programmed to process the VR session integrator. The VR session integrator has access to one or more networks during its processing. The networks can be wired, wireless, or a combination of wired and wireless.

In an embodiment, the device that executes the VA session integrator is a server.

In an embodiment, the device that executes the VR session integrator is a cloud (a collection of logical servers that can be geographically dispersed from one another).

In an embodiment, the VA session integrator is the VA collaborator 130.

In an embodiment, the VR session integrator is the method 200 and discussed above with the FIG. 2.

The VR session integrator presents another and in some ways enhanced perspective of the method 200.

At 310, the VR session integrator dynamically switches between a non-VR session occurring over a non-VR communication channel to a VR session occurring over a VR communication channel while maintaining a synchronized state between the non-VR session and the VR session.

In an embodiment, at 311, the VR session integrator changes an appearance and manner in which the synchronized state is presented within the VR session from a different appearance and a different manner presented within the non-VR session.

At 320, the VR session integrator joins at least one third-party that did not initiate the non-VR session or the VR session to the VR session.

According to an embodiment, at 321, the VR session integrator joins the third-party in response to a request made by the user during the VR session.

In an embodiment, at 322, the VR session integrator joins the third-party in response to an acceptance by the user of an invitation to join the third-party made during the VR session.

At 330, the VR session integrator facilitates collaboration between a user that initiated the non-VA session or the VA session and the at least one third-party during the VR session with simulated reality with respect to at least one item identified by the user during the non-VR session.

In an embodiment, at 331, the VR session integrator conducts a user-initiated transaction for purchasing the item during the VR session.

In an embodiment, at 340, the VR session integrator maintains the synchronized state as a single integrated session between the non-VR session and the VA session.

Figure 4:
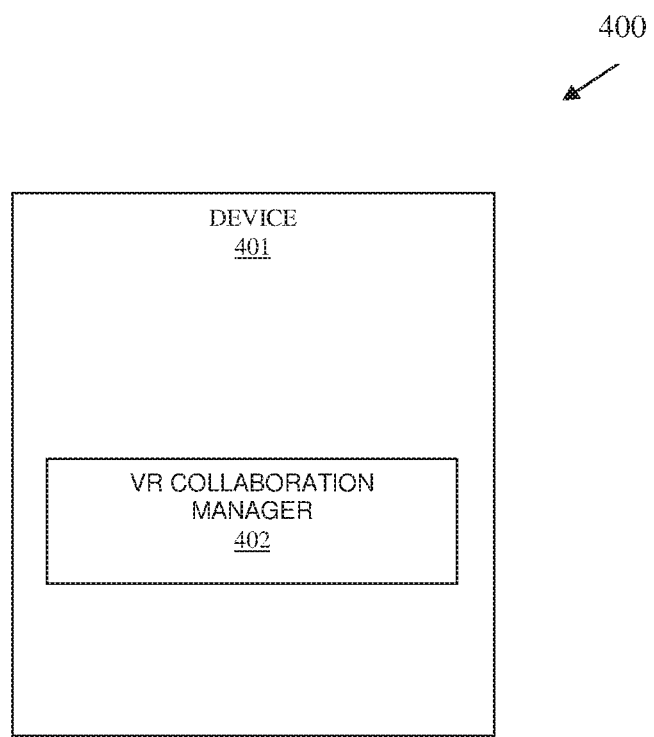
FIG. 4 is a diagram of another system for omni-channel VR collaboration processing, according to an example embodiment.

FIG. 4 is a diagram of another system 400 for omni-channel VA collaboration processing, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1A-1B and 2-3.

The system 400 includes a server 401 and the server including a VR collaboration manager 402.

The VR collaboration manager 402 is configured to: 1) execute on at least one hardware processor of the server 401; 2) dynamically switch between a non-VR session and a VR session while maintaining a synchronized state between the non-VR session and the VR session, and 3) conduct a user-drive transaction for an item with a collaborating third-party participating in the VR session during the VR session.

In an embodiment, item is depicted within the VR session within a simulated actual physical context and setting.

In an embodiment, the VR collaboration manager 402 is the VR collaborator 130.

In an embodiment, the VR collaboration manager 402 is the method 200.

In an embodiment, the VR collaboration manager 402 is the method 300.

In an embodiment, the VR collaboration manager 402 is all or some combination of the processing discussed with the FIGS. 1A-1B and the methods 200-300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    receiving an indication to switch from a session over a communication channel to a Virtual Reality (VR) session over a VR communication channel;
    maintaining the session over the communication channel and initiating the VR session over the VR communication channel;
    configuring the VR session for the VR communication channel with a current context of the session that is associated with the communication channel, wherein the current context is an interaction state occurring with the session when the VR session is initiated;
    maintaining the VR session over the VR communication channel;
    synchronizing interactions occurring within the session and the within VR session; and
    dynamically switching back and forth between the session over the communication channel and the VR session over the VR communication channel.

2. The method of claim 1 further comprising, adding a third-party to the VR session for collaboration with a user of the VR session.

3. The method of claim 1 further comprising, receiving a second indication to switch from the VR session back to the session and configuring the session with a current context for the VR session.

4. The method of claim 1 further comprising, interacting with a user within the VR session using visual simulated reality.

5. The method of claim 4, wherein interacting further includes interacting with the user within the VR session using audio commands.

6. The method of claim 5, wherein interacting further includes interacting with the user within the VR session using user-initiated touch-based selection of objects presented within the VR session.

7. The method of claim 1, wherein receiving further includes identifying the indication as a selection made by a user in a browser-based interface to transition a browser-based session to the VR session.

8. The method of claim 1, wherein receiving further includes identifying the indication as a selection made or directed by a user while operating a Point-Of-Sale (POS) terminal.

9. The method of claim 1, wherein configuring further includes presenting the current context on a visible wall presented within the VR session.

10. The method of claim 9, wherein presenting further includes presenting on the visible wall preferences of a user recorded or accessible to the session of the communication channel.

11. The method of claim 10, wherein presenting further includes permitting a user to interact within the VR session with components of the current context and the preferences through touch-based user manipulation or selection of the components on the visible wall.

12. The method of claim 11, wherein permitting further includes identifying a particular interaction with a particular component as a user-initiated command to provide a virtual wallet for payment of a particular item during the VR session.

13. A method, comprising:
    dynamically switching between a non-Virtual Reality (VR) session occurring over a non-VR communication channel to a VR session occurring over a VR communication channel while maintaining a synchronized state between the non-VR session and the VR session, wherein the synchronized state includes first interactions occurring over the non-VR session and second interactions occurring over the VR session;
    joining at least one third-party that did not initiate the non-VR session or the VR session to the VR session; and
    facilitating collaboration between a user that initiated the non-VR session or the VR session and the at least one third-party during the VR session with simulated reality with respect to at least one item identified by the user during the non-VR session.

14. The method of claim 13 further comprising, maintaining the synchronized state as a single integrated session between the non-VR session and the VR session.

15. The method of claim 13, wherein dynamically switching further includes changing an appearance and manner in which the synchronized state is presented within the VR session from a different appearance and a different manner in which the synchronized state is presented within the non-VR session.

16. The method of claim 13, wherein joining further includes joining the third-party in response to a request made by the user during the VR session.

17. The method of claim 13, wherein joining further includes joining the third-party in response to an acceptance by the user of an invitation to join the third-party made during the VR session.

18. The method of claim 13, wherein facilitating further includes conducting a user-initiated transaction for purchasing the item during the VR session.

19. A system (SST), comprising:
    a server; and
    a Virtual Reality (VR) collaboration manager;
    wherein the VR collaboration manager is configured to: (i) execute on at least one hardware processor of the server; (ii) dynamically switch between a non-VR session and a VR session while maintaining a synchronized state between the non-VR session and the VR session, wherein the synchronized state includes first interactions occurring over the non-VR session and second interactions occurring over the VR session, and (iii) conduct a user-drive transaction for an item with a collaborating third-party participating in the VR session during the VR session.

20. The system of claim 19, wherein the item is depicted within the VR session within a simulated actual physical context and setting.

* * * * *